(12) United States Patent
Hiratsuka et al.

(10) Patent No.: US 10,346,582 B2
(45) Date of Patent: Jul. 9, 2019

(54) NON-TRANSITORY COMPUTER-READABLE RECORDING MEDIUM HAVING ELECTROMAGNETIC NOISE COUNTERMEASURE VERIFICATION PROGRAM RECORDED THEREON, INFORMATION PROCESSING APPARATUS, AND METHOD OF VERIFYING ELECTROMAGNETIC NOISE COUNTERMEASURE

(71) Applicant: FUJITSU LIMITED, Kawasaki-shi, Kanagawa (JP)

(72) Inventors: Yoshiaki Hiratsuka, Ota (JP); Kai Nojima, Yokohama (JP); Kenji Nagase, Yokohama (JP); Yoshinori Mesaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 15/719,651

(22) Filed: Sep. 29, 2017

(65) Prior Publication Data

US 2018/0150591 A1 May 31, 2018

(30) Foreign Application Priority Data

Nov. 28, 2016 (JP) .................................. 2016-229766

(51) Int. Cl.
*G06F 17/50* (2006.01)

(52) U.S. Cl.
CPC ...... *G06F 17/5081* (2013.01); *G06F 17/5036* (2013.01); *G06F 2217/82* (2013.01)

(58) Field of Classification Search
CPC ............ G06F 17/5081; G06F 17/5036; G06F 2217/82; H05K 1/0216; H05K 3/0005;
(Continued)

(56) References Cited

U.S. PATENT DOCUMENTS 6,566,596 B1 * 5/2003 Askew ................ H01L 23/3135
174/391
6,604,225 B1 * 8/2003 Otsu .................. G01R 29/0892
703/14

(Continued)

FOREIGN PATENT DOCUMENTS

JP U3065107 1/2000
JP 2006-318416 11/2006
(Continued)

*Primary Examiner* — Nha T Nguyen
(74) *Attorney, Agent, or Firm* — Fujitsu Patent Center

(57) ABSTRACT

A coupling distance y of a plurality of securing elements for coupling two members to construct a casing for accommodating a circuit board having electric components mounted thereon inside space surrounded by a conductor extracted from design data, an overlapping width x of overlap sections provided to the two members for coupling the two members with the plurality of securing elements, the overlap sections contacting to each other, and a wavelength λ of electromagnetic noises generated from the electric components, are extracted. Then, a recommended coupling distance Y for the plurality of securing elements to attenuate the electromagnetic noises by a certain attenuation amount is calculated, based on the overlapping width x and the wavelength λ, and the coupling distance y is compared with the recommended coupling distance Y. Thereby, verifications of an electromagnetic noise countermeasure can be made reliably without relying on settings by a user.

17 Claims, 17 Drawing Sheets

(58) Field of Classification Search
CPC ...... H05K 5/0008; H05K 5/03; H05K 9/0007;
H05K 9/0015; H05K 9/0049; H05K
9/0062; H05K 9/0088; H05K 1/023;
H05K 2201/09063; H05K 2201/10371;
H05K 9/0032
See application file for complete search history.

(56) References Cited

U.S. PATENT DOCUMENTS

| | | | | |
|---|---|---|---|---|
| 6,754,876 | B2* | 6/2004 | Sasaki | G06F 17/5068 |
| | | | | 716/119 |
| 7,353,908 | B1* | 4/2008 | French | G10K 11/178 |
| | | | | 181/206 |
| 9,072,168 | B2* | 6/2015 | Jeong | H05K 1/023 |
| 9,536,033 | B2* | 1/2017 | Ogawa | H05K 1/0216 |
| 2001/0050175 | A1* | 12/2001 | Pulver | H01L 23/552 |
| | | | | 174/32 |
| 2002/0033706 | A1* | 3/2002 | Khazei | G01R 29/0821 |
| | | | | 324/750.22 |
| 2002/0039030 | A1* | 4/2002 | Khazei | G01R 29/0871 |
| | | | | 324/754.29 |
| 2002/0070044 | A1* | 6/2002 | Pommerenke | H05K 9/0062 |
| | | | | 174/384 |
| 2003/0221849 | A1* | 12/2003 | Pommerenke | H05K 9/0015 |
| | | | | 174/383 |
| 2006/0096773 | A1* | 5/2006 | Cochrance | H05K 9/0015 |
| | | | | 174/377 |
| 2008/0158851 | A1* | 7/2008 | Cochrane | H05K 9/0073 |
| | | | | 361/818 |
| 2010/0148883 | A1* | 6/2010 | Bodette | H04B 3/46 |
| | | | | 333/17.1 |
| 2010/0200288 | A1* | 8/2010 | Cochrane | H05K 9/0009 |
| | | | | 174/384 |
| 2011/0080721 | A1* | 4/2011 | Yukiyoshi | H04N 5/64 |
| | | | | 361/816 |
| 2011/0083895 | A1* | 4/2011 | Cochrane | H05K 9/0015 |
| | | | | 174/384 |
| 2011/0194267 | A1* | 8/2011 | Sun | H05K 9/0015 |
| | | | | 361/807 |
| 2014/0181770 | A1* | 6/2014 | Ogawa | G06F 17/5068 |
| | | | | 716/112 |
| 2015/0109740 | A1* | 4/2015 | Yeh | H05K 1/0216 |
| | | | | 361/748 |
| 2016/0157355 | A1* | 6/2016 | Paoletti | G06F 17/5036 |
| | | | | 716/122 |
| 2018/0027707 | A1* | 1/2018 | Hiratsuka | H05K 5/0008 |
| | | | | 333/12 |
| 2019/0008079 | A1* | 1/2019 | Kondo | H01L 23/00 |

FOREIGN PATENT DOCUMENTS

| | | |
|---|---|---|
| JP | 2007-67195 | 3/2007 |
| JP | 2015-26173 | 2/2015 |

* cited by examiner

FIG. 12

| UPPER STRUCTURAL MEMBER / LOWER STRUCTURAL MEMBER | ELECTRIC PARTS PRINTED BOARDS | ELECTRIC PARTS CONNECTORS | ELECTRIC PARTS | EMC COUNTERMEASURES PURCHASED PARTS | PURCHASED PARTS | SECURING PARTS | STRUCTURAL PARTS |
|---|---|---|---|---|---|---|---|
| ELECTRIC PARTS PRINTED BOARDS | — | — | — | ○ | — | ○ | — |
| ELECTRIC PARTS CONNECTORS | — | — | — | ○ | — | ○ | — |
| ELECTRIC PARTS | — | — | — | ○ | — | ○ | — |
| EMC COUNTERMEASURES PURCHASED PARTS | ○ | ○ | ○ | ○ | ○ | ○ | ○ |
| PURCHASED PARTS | — | — | — | ○ | — | ○ | — |
| SECURING PARTS | ○ | ○ | ○ | ○ | ○ | ○ | ○ |
| STRUCTURAL PARTS | — | — | — | ○ | — | ○ | — |

FIG. 15

| UPPER STRUCTURAL MEMBER | LOWER STRUCTURAL MEMBER |
|---|---|
| lid1 | box1 |
| sw1 | — |
| sw2 | — |

NON-TRANSITORY COMPUTER-READABLE RECORDING MEDIUM HAVING ELECTROMAGNETIC NOISE COUNTERMEASURE VERIFICATION PROGRAM RECORDED THEREON, INFORMATION PROCESSING APPARATUS, AND METHOD OF VERIFYING ELECTROMAGNETIC NOISE COUNTERMEASURE

CROSS-REFERENCE TO RELATED APPLICATION

This application is based upon and claims the benefit of priority of the prior Japanese Application No. 2016-229766 filed on Nov. 28, 2016 in Japan, the entire contents of which are hereby incorporated by reference.

FIELD

The present embodiment relates to a non-transitory computer-readable recording medium having an electromagnetic noise countermeasure verification program recorded thereon, an information processing apparatus, and a method of verifying an electromagnetic noise countermeasure.

BACKGROUND

An advancement in electronic devices has promoted accelerations of clock signals used in electronic devices. When high-speed clock signals operate on a circuit board (e.g., a printed circuit board) in an electronic device, electromagnetic noises are generated and are emitted from the other electronic devices. Such electromagnetic noises may affect other electronic devices and may cause misoperations in those electronic devices. Accordingly, a regulation of the leakage amount of electromagnetic noises from electronic devices has been enforced, and electro-magnetic compatibility (EMC) countermeasures have been required in design and assembly steps of electronic devices.

Because electromagnetic noises can be blocked by conductors (e.g., metals), accommodating an electronic circuit that may become a source of electromagnetic noises in a sealed casing made of a metal is regarded as one EMC countermeasure. More specifically, respective flange sections are provided to two metal-made members to construct a casing, and flange sections of the two members are overlapped and then the two members are secured with screws, calking, rivets, welding, and the like (hereinafter referred to as "securing elements") while maintaining the overlapping.

Patent Document 1: Japanese Registered Utility Model No. 3065107
Patent Document 2: Japanese Laid-open Patent Publication No. 2007-67195
Patent Document 3: Japanese Laid-open Patent Publication No. 2006-318416
Patent Document 4: Japanese Laid-open Patent Publication No. 2015-26173

An EMC countermeasure (also referred to as an electromagnetic noise countermeasure or shield countermeasure) as described above is started from a CAD (computer aided design) design phase of a product. In this case, whether leakage of electromagnetic noises can be controlled by an EMC countermeasure is verified using functions provided to CAD system. The verification is made by comparing the distance between securing elements described above in the flange sections (overlap sections), with a threshold for checking the distance between the securing elements. When the distance between the securing elements is equal to or smaller than the threshold, it is determined that a verification result is a pass. In contrast, the distance between the securing elements exceeds the threshold, it is determined that the verification result is a fail.

In this case, because the above-described threshold is set by a user, the leakage amount of electromagnetic noises may be deviated and a human task error may occur. Further, because the width of overlap sections (the sections at which flange sections overlap), which contributes to a reduction in the leakage amount of electromagnetic noises, is not taken into considerations, electromagnetic noises may leak from an electronic device during an actual operation of the electronic device even though a verification result has been determined as a pass.

SUMMARY

An electromagnetic noise countermeasure verification program of the present embodiment causes a computer to execute the following processes (1) to (3):
(1) a process to extract, from design data, a coupling distance y of a plurality of securing elements for coupling two members to construct a casing for accommodating a circuit board having one or more electric components mounted thereon inside space surrounded by a conductor, an overlapping width x of overlap sections provided to the two members for coupling the two members with the plurality of securing elements, the overlap sections contacting to each other, and a wavelength $\lambda$ of electromagnetic noises generated from the one or more electric components;
(2) a process to calculate a recommended coupling distance Y for the plurality of securing elements to attenuate the electromagnetic noises by a certain attenuation amount, based on the overlapping width x and the wavelength $\lambda$ that are extracted; and
(3) a process to compare the extracted coupling distance y with the calculated recommended coupling distance Y.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 12 is a diagram illustrating one example of a securing section coupling rule of the present embodiment;

FIG. 15 is a diagram illustrating the securing section coupling rule for the casing depicted in FIGS. 13 and 14;

DESCRIPTION OF THE PREFERRED EMBODIMENTS

Figure 1:
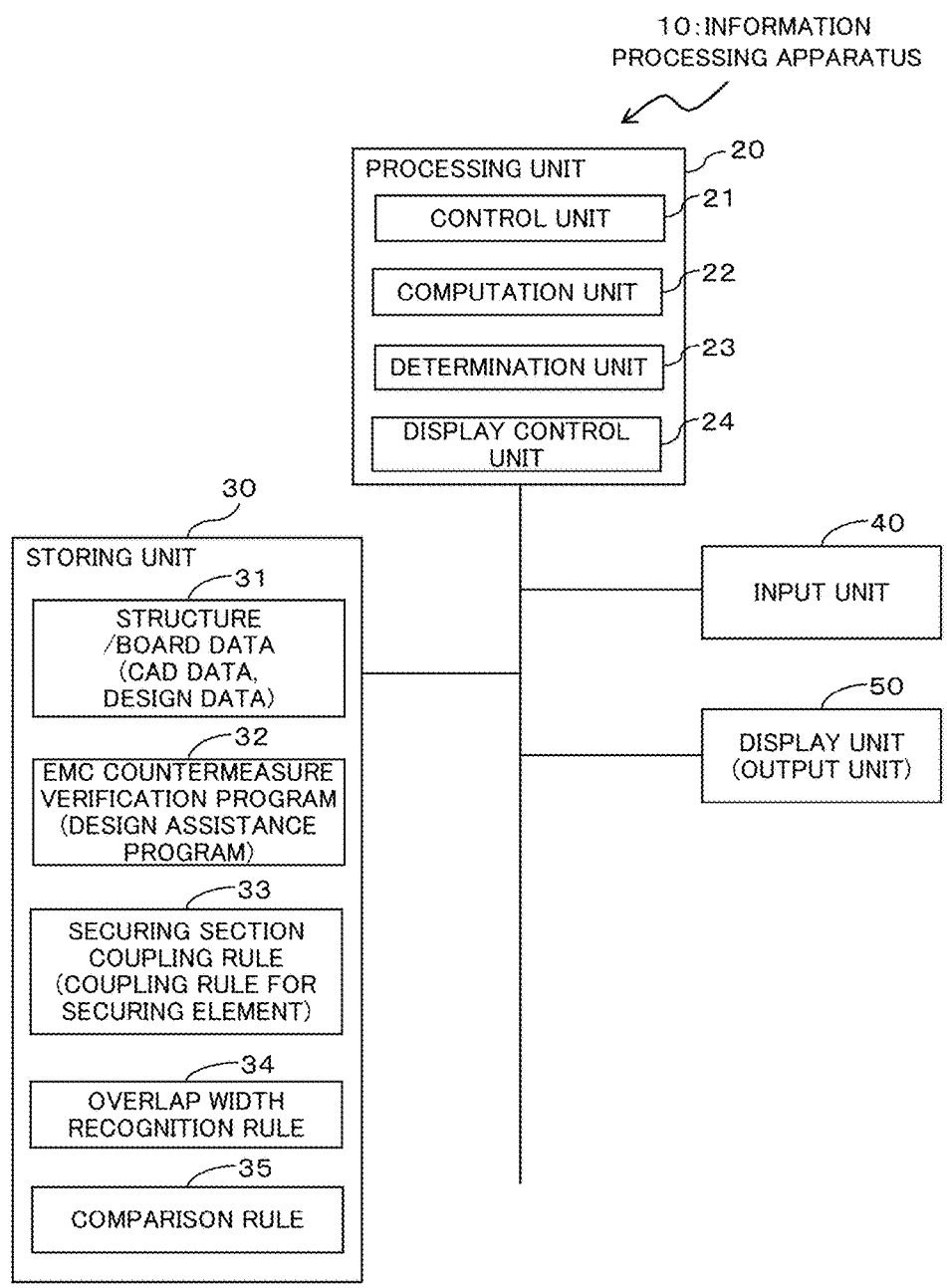
FIG. 1 is a block diagram illustrating one example of a functional configuration of an information processing apparatus having an electromagnetic noise countermeasure verification function as one embodiment of the present invention.

Hereinafter, an embodiment of a non-transitory computer-readable recording medium having an electromagnetic noise countermeasure verification program recorded thereon, an information processing apparatus, and a method of verifying an electromagnetic noise countermeasure disclosed in the present application will be described in detail with reference to the drawings. Note that the embodiments described below are merely exemplary, and it is not intended to exclude a wide variety of modifications and applications of techniques that are not described explicitly in the embodiments. In other words, the present embodiments may be practiced in various modifications without departing from the spirit thereof. In addition, it is not intended that only elements depicted in the drawings are provided, and other functions may be included. Further, the embodiments may be combined in a suitable manner in the extent wherein the contents of processes have no contradiction.

Figure 3:
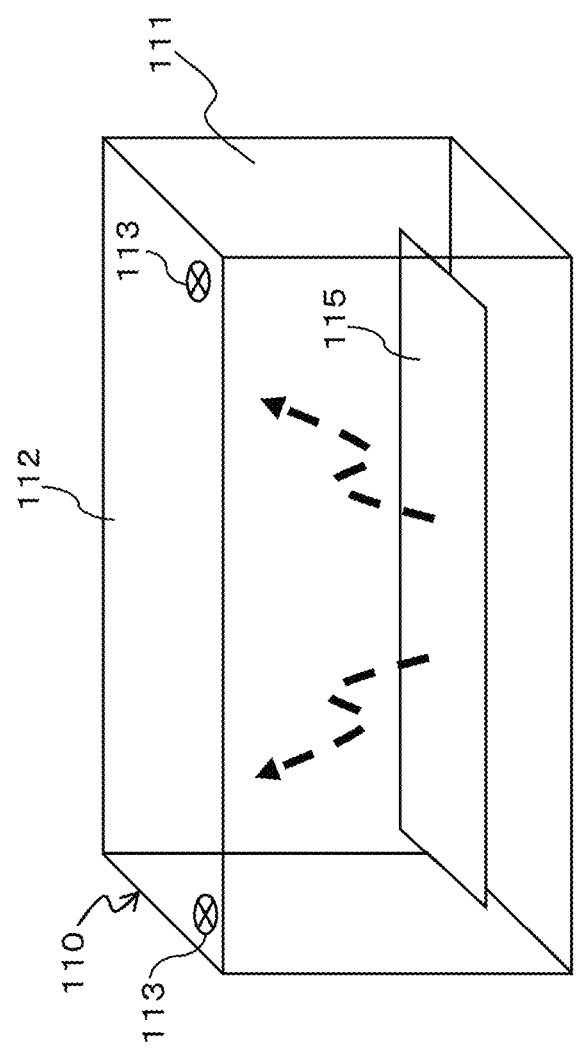
FIG. 3 is a perspective view schematically depicting one example of an electronic device.

(1) With Regard to EMC Countermeasure, and Verification Standard for EMC Countermeasure of Present Embodiment FIG. 3 is a perspective view schematically depicting one example of an electronic device. In a casing 110 of an electronic device depicted in FIG. 3, a circuit board 115 having a central processing unit (CPU) and other electric components mounted thereon is accommodated.

The casing 110 includes a box-shaped body (first member) 111, and a flat plate-shaped lid (second member) 112 that is placed on the box-shaped body 111. The box-shaped body 111 is constructed from a rectangular bottom plate and four rectangular side plates surrounding the bottom plate. The lid 112 is secured to the box-shaped body 111 with screws 113.

The screws 113 are one example of securing elements to couple the box-shaped body 111 and the lid 112 and secure the lid 112 to the box-shaped body 111. Calking, rivets, welding, and the like may be used as securing element in place of screws. Hereinafter, securing elements may also be referred to as securing sections.

Figure 6:
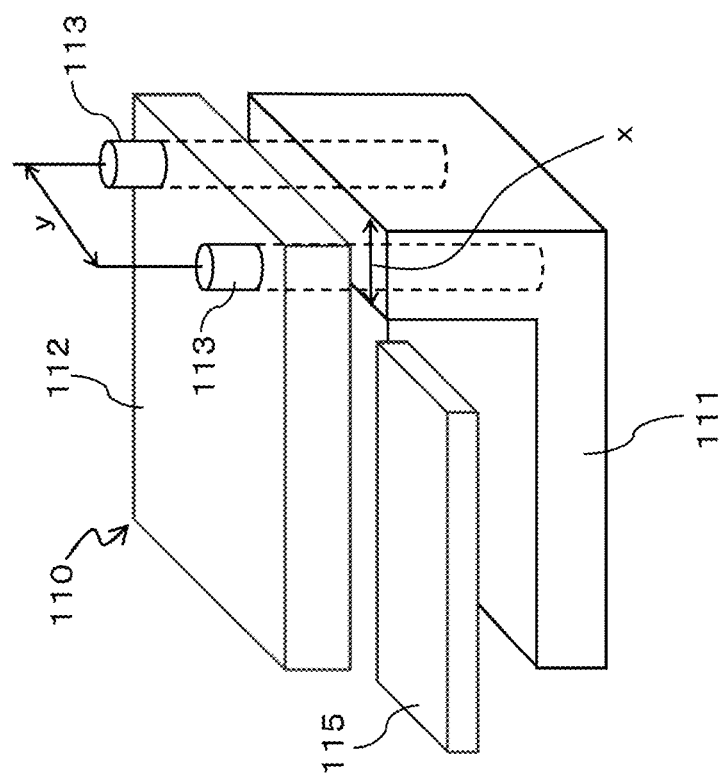
FIG. 6 is an exploded perspective view schematically depicting a part of the casing by cutting it.
Figure 9:
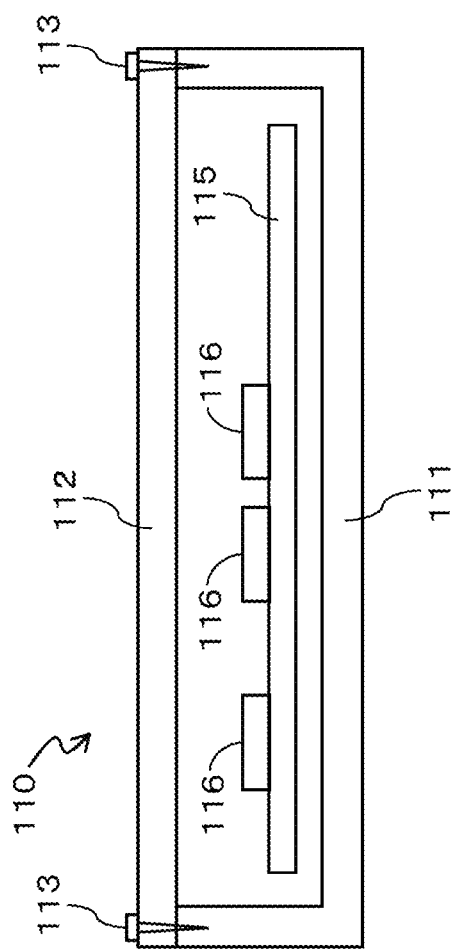
FIG. 9 is a sectional view schematically depicting an electronic device according to the present embodiment.
Figure 10:
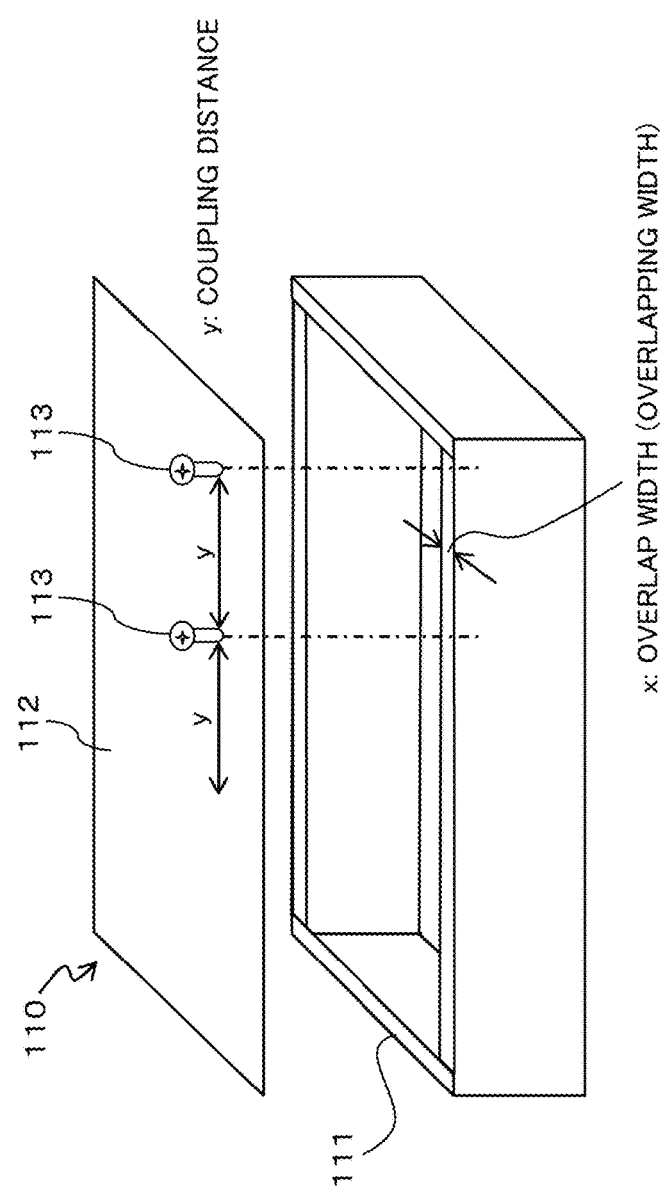
FIG. 10 is an exploded perspective view schematically depicting a casing for the electronic device in the present embodiment, in order to illustrate the securing section coupling distance y and the overlapping width x.

Note that the upper surface of the box-shaped body 111 (i.e., the upper surfaces of the side plates) has a width that is equivalent to the width of the side plates (refer to FIGS. 6, 9, and 10). For attaching the lid 112 to the box-shaped body 111, the lid 112 is placed on the box-shaped body 111 so as to form an overlap such that the upper surface of the box-shaped body 111 and the lower surface of the lid 112 contact to each other place. The lid 112 is coupled and secured to the box-shaped body 111 by screwing and threading the screws 113 into the side plates from the upper surfaces of the side plates of the box-shaped body 111 in the sections (overlapping sections) in which the box-shaped body 111 and the lid 112 overlap. In this case, the width equivalent to the width of the side plates correspond to the aforementioned overlapping width (overlap width) x of the overlap section.

In addition, a flange section 111a (refer to FIG. 11) that extends from the outside toward the inside of the casing 110 on the top of the box-shaped body 111 may be formed in order to attach the lid 112 to the box-shaped body 111. In this case, the upper surface of the flange section 111a and the upper surface of the box-shaped body 111 (i.e., the upper surfaces of the side plates) are formed such that they are on the same plane. For attaching the lid 112 to the box-shaped body 111, the lid 112 is placed on the box-shaped body 111 so as to form an overlap such that the upper surface of the box-shaped body 111 including the upper surface of the flange section 111a and the lower surface of the lid 112 contact to each other. The lid 112 is coupled and secured to the box-shaped body 111 by screwing and threading the screws 113 into the flange section 111a in the overlap sections (overlapping sections) of the box-shaped body 111 and the lid 112. In this case, the length from the upper surfaces of the side plates, to which the lower surface of the lid 112 contacts, to the upper surface of the flange section 111a (the length in the direction of the plate thickness of the side plates) corresponds to the aforementioned overlapping width (overlap width) x of the overlap section.

The surfaces of the box-shaped body 111 and the lid 112 (the inner surfaces or the outer surfaces and the edge surfaces) are made conductive for the purpose of an EMC countermeasure, and the circuit board 115 is tightly enclosed inside the space surrounded by conductors. This prevents leakage of electromagnetic noises from the circuit board 115 to the outside of the casing 110 and entries of electromagnetic noises from the outside to the inside of the casing 110.

Figure 4:
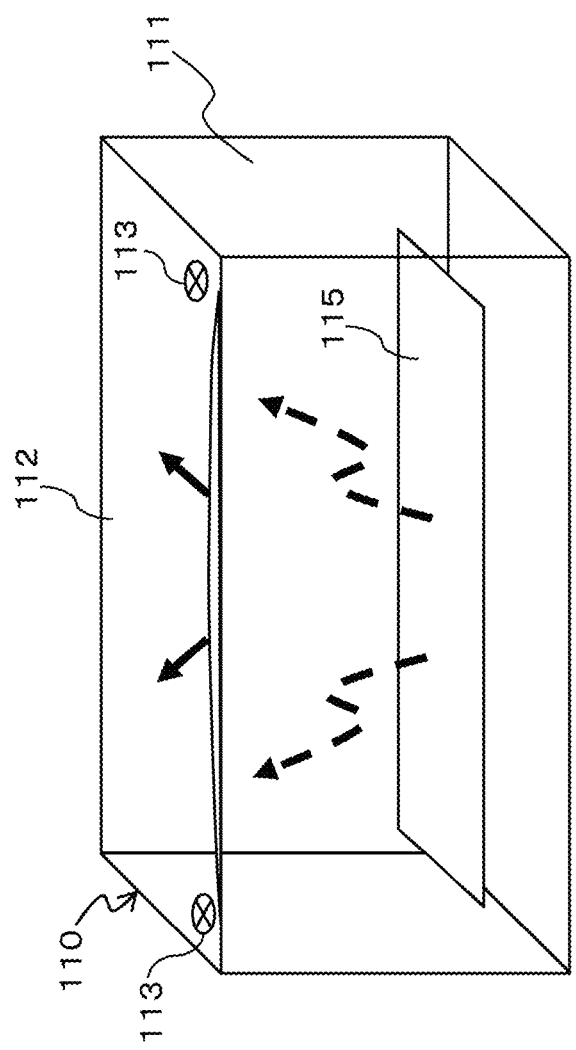
FIG. 4 is a perspective view schematically depicting a casing having a part in which a contact between a box-shaped body and a lid is not sufficiently tight between screws.

In the meantime, if the lower surface of the lid 112 and the upper surface of the box-shaped body 111 made a perfect close contact as depicted in FIG. 3, the casing 110 could block electromagnetic noises. In reality, however, as depicted in FIG. 4, there is a part (gap) in which a contact between the upper surface of the box-shaped body 111 and the lower surface of the lid 112 is not sufficiently tight between adjacent screws 113, and electromagnetic noises may leak from that part.

To prevent leakage of electromagnetic noises between the box-shaped body 111 and the lid 112, the technique disclosed in Patent Document 2 provides the respective flange sections to the box-shaped body 111 and the lid 112, which have widths corresponding to the placement distance of the screws 113 and the frequency of electromagnetic noises. In this case, the flange sections are formed at the box-shaped body 111 and the lid 112 so as to protrude outwardly from the box-shaped body 111 and the lid 112. The lid 112 is coupled and secured to the box-shaped body 111 by placing the lid 112 on the box-shaped body 111 such that the flange section of the box-shaped body 111 and the flange section of the lid 112 overlap, and coupling the flange sections with screws and the like. In accordance with the technique disclosed in Patent Document 2, in the casing 110 having such a structure, the width of the flange sections is calculated as 5 cm for attenuating electromagnetic noises having a frequency of 1000 MHz by a certain attenuation amount of 15 dB, for example, when the placement distance of the screws is set to 7.5 cm. Here, the placement distance of the screws corresponds to the coupling distance y of the present embodiment, and the width of the flange sections corresponds to the overlapping width (overlap width) x of the present embodiment.

Figure 5:
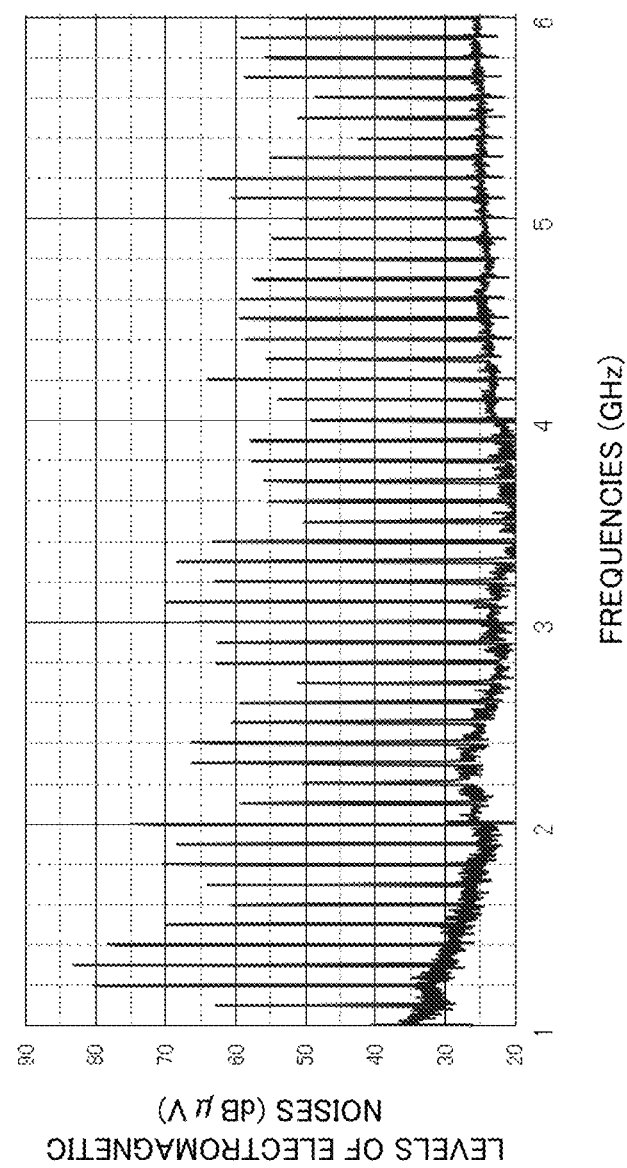
FIG. 5 is a diagram illustrating a result of a study of intensities of electromagnetic noises generated from a circuit board.

The inventors of present application studied intensities of electromagnetic noises generated from a circuit board having electric components (e.g., a CPU) mounted thereon. FIG. 5 is a diagram illustrating a result of the study of the intensities of electromagnetic noises generated from the circuit board, in which the horizontal axis represents frequencies of clock signals, and the vertical axis represents levels of electromagnetic noises.

As depicted in FIG. 5, electromagnetic noises of about 80 dBpV were generated from the circuit board. On the other hand, the regulatory level of electromagnetic noises is about 50 dBpV, although each county sets a different level. Accordingly, it is suffice if a casing can reduce electromagnetic noises generated from circuit boards by 30 dB.

The inventors of present application studied attenuation amounts of electromagnetic noises under various conditions, while varying the overlapping width x of the two members (the box-shaped body 111 and the lid 112 depicted in FIG. 3 and the like) to construct the casing and the placement distance y of securing elements (e.g., screws). Here, the overlapping width x is the width of parts (overlap sections) in which conductors of the two members overlap.

FIG. 6 is an exploded perspective view schematically depicting a part of the casing 110 by cutting it. Here, as depicted in FIG. 6, the circuit board 115 that is the source of electromagnetic noises is placed inside the casing 110 constructed from the box-shaped body 111 and the lid 112 which are made of a metal. Here, as set forth above, the overlapping width between the upper surfaces of the side plates of the box-shaped body 111 and the lower surface of the lid 112 is assumed to be x, and the distance between adjacent screws 113, 113 (placement distance, coupling distance) is assumed to be y.

Note that attenuation amounts of electromagnetic noises were studied using sinusoidal signals in Patent Document 2, whereas the inventors of present application studied attenuation amounts of electromagnetic noises using clock signals (pulsed rectangular wave signals) flowing through the circuit board 115. This is because electromagnetic noises from an electronic device (e.g., a computer) are primarily induced by the clock signals flowing through the circuit board 115. For analyses of the attenuation amounts of electromagnetic noises, electromagnetic field analysis software (Poynting for Microwave) from Fujitsu Limited can be used, for example.

Figure 7:
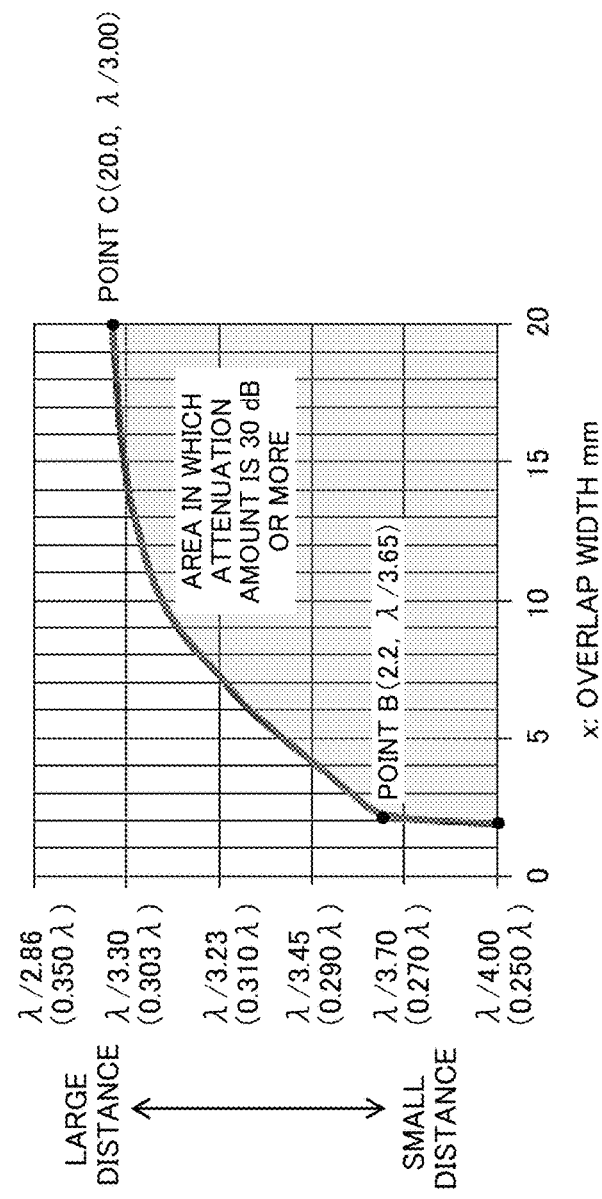
FIG. 7 is a graph indicating the relationship between an overlapping width x and a securing section coupling distance y (recommended coupling distance Y), to attenuate electromagnetic noises by a certain attenuation amount of 30 dB.

The curve as depicted in FIG. 7 was obtained in the analyses of the attenuation amounts of electromagnetic noises using the electromagnetic field analysis software, as the relationship between the overlapping width x of the two members (the box-shaped body 111 and the lid 112) to construct the casing 110 and the placement distance y of the screws 113 when the attenuation amount was set to 30 dB. FIG. 7 is a graph obtained by connecting points where the attenuation amount was 30 dB, in which the horizontal axis represents the overlapping width x, and the vertical axis represents the placement distance y of the screws 113. Note that $\lambda$ in FIG. 7 is the wavelength of electromagnetic noises (in unit of millimeters), and $\lambda = c/f$. Here, c is the speed of transmission of radio waves, i.e., the speed of light of $3 \times 10^8$ meters/second, and f is the frequency of clock signals. In cases where clock signals having different frequencies are used, the maximum frequency is used as f, and the wavelength of clock signals at the maximum frequency is used as $\lambda$.

If the relationship between the overlapping width x of the box-shaped body 111 and the lid 112 and the placement distance y of the screws 113 is located on or below the curve depicted in FIG. 5, the amount of electromagnetic noise leaking outside the casing 10 can be attenuated by a desired amount of 30 dB or more, and the amount of the leaking electromagnetic noises can be reduced to 50 dBpV or lower. In other words, it is possible to determine that a verification result of the EMC countermeasure is a pass.

Hence, in the present embodiment, hereinafter, the values of y on the curve depicted in FIG. 7 are regarded as a verification standard (recommended coupling distance) Y for an EMC countermeasure, and a notification is output indicating that the result of the EMC countermeasure verification for the casing 110 is a pass when the coupling distance y of the screws 113 is equal to or smaller than the recommended coupling distance Y, as will be described later. In contrast, when the coupling distance y of the screws 113 exceeds the recommended coupling distance Y, a notification is output indicating that the result of the EMC countermeasure verification for the casing 110 is a fail.

Figure 8:
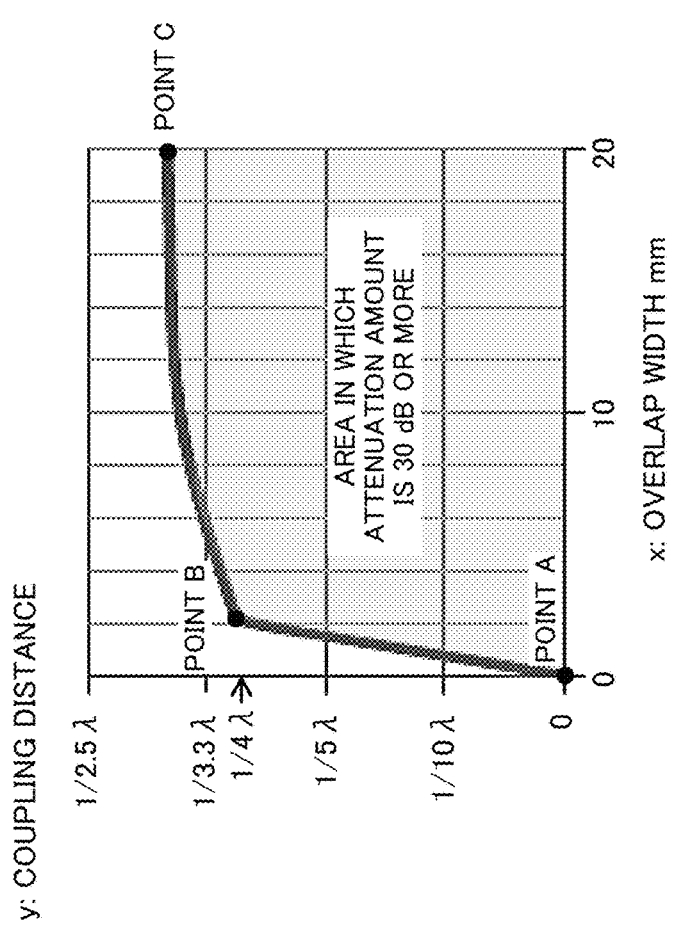
FIG. 8 is a graph indicating the curve indicating the recommended coupling distance Y in FIG. 7, by separating into a line approximated part and a curve approximated part.

As depicted in FIG. 8, the inventors of present application divided the curve depicted in FIG. 7 into a part approximated in a line (the line between the points A and B) and a part approximated in a curve (the curve between the points B and C), and expressed the respective parts as in the following formulae (1) and (2). Here, the (x, y) coordinate of the point A is (0, 0), the (x, y) coordinate of the point B is (2.2, $\lambda/3.65$), and the (x, y) coordinate of the point C is (20.0, $\lambda/3.00$).

$$Y = (0.13x + 0.0015)\lambda \quad (1)$$

$$Y = (10^{-5}x^3 - 0.0006x^2 + 0.012x + 0.25)\lambda \quad (2)$$

According to FIG. 8, when the frequency of clock signals is 1000 MHz and the placement distance y of the screws 113 is λ/4 (=7.5 cm), for example, an overlapping width x between the box-shaped body 111 and the lid 112 of 2 mm is suffice. Stated differently, when the overlapping width x between the box-shaped body 111 and the lid 112 is set to 2 mm or more, an placement distance of the screws 113 can be set to λ/4 or longer. In other words, when the overlapping width x is 2 mm and the frequency of clock signals is 1000 MHz, the recommended coupling distance Y is calculated as λ/4 (=7.5 cm). Accordingly, when the coupling distance of the screws 113 is equal to or smaller than λ/4 (=7.5 cm), the result of the EMC countermeasure verification for the casing 110 is determined as a pass.

Note that, when significant digits are increased, the above-described formulae (1) and (2) can be expressed in the following formulae (1)' and (2)':

$$Y=(0.1285x+0.0015)\lambda \quad (1)'$$

$$Y=(10^{-5}x^3-0.0006x^2+0.0123x+0.2498)\lambda \quad (2)'$$

Upon a verification of an EMC countermeasure (comparison of the coupling distance y of the screws 113 with the recommended coupling distance Y and determination), the recommended coupling distance Y used for the comparison may be calculated using the formula (1)' or (2)' in place of the formula (1) or (2).

FIG. 9 is a sectional view schematically depicting an electronic device according to the present embodiment. FIG. 10 is an exploded perspective view schematically depicting the casing 110 for the electronic device in the present embodiment, in order to illustrate the securing section coupling distance y and the overlapping width x.

As depicted in FIG. 9, the circuit board 115 is accommodated inside the casing 110. The circuit board 115 has a CPU and other electric components 116 mounted thereon, and such electric components 116 operate on clock signals of 1000 MHz.

The casing 110 is constructed from the box-shaped body 111 and the lid 112. Here, the box-shaped body 111 and the lid 112 are formed from a resin, and their surfaces (the inner surface or the outer surface and the edge surfaces) are covered with a conductor (e.g., a metal). Alternatively, both the box-shaped body 111 and the lid 112 may be formed from a metal.

In an EMC countermeasure verification for an electronic device in accordance with of the present embodiment, the recommended coupling distance Y, when the overlap width (overlapping width) is x (refer to FIG. 10) and the electromagnetic noise frequency is f, is calculated as a verification standard for an EMC countermeasure on the basis of the above-described formula (1)/formula (2) or the above-described formula (1)'/formula (2)'. Then a result of the EMC countermeasure verification for the casing 110 is determined as a pass when the coupling distance y of the screws 113 (refer to FIG. 10) is equal to or smaller than the recommended coupling distance Y.

Accordingly, a verifications of an EMC countermeasure can be made reliably without relying on settings by a user. Further, because the circuit board 115 that is the source of electromagnetic noises is placed inside a casing 110 that has passed an EMC countermeasure verification, electromagnetic noises can be attenuated by a certain attenuation amount (e.g., 30 dB) and it is ensured that the amount of electromagnetic noises leaking outside of the casing 110 is suppressed to a certain value (e.g., 50 dBpV) or less.

Figure 2:
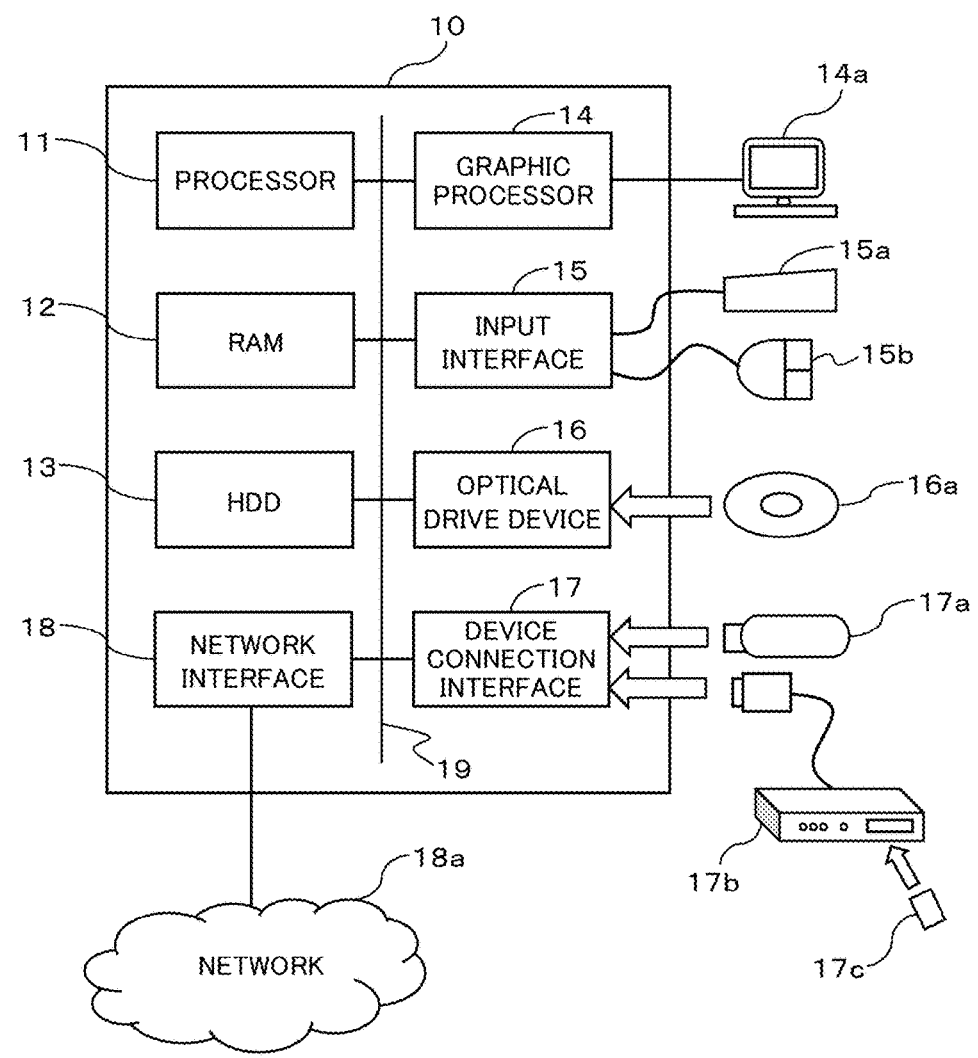
FIG. 2 is a block diagram illustrating one example of a hardware configuration of the information processing apparatus embodying the electromagnetic noise countermeasure verification function as one embodiment of the present invention.

(2) Hardware Configuration of Information Processing Apparatus of Present Embodiment Embodying EMC Countermeasure Verification Function Now, referring to FIG. 2, a hardware configuration of the information processing apparatus (computer) 10 embodying the EMC countermeasure verification function (design assistance function) of the present embodiment will be described. FIG. 2 is a block diagram illustrating one example of such a hardware configuration.

The computer 10 includes, as components, a processor 11, a random access memory (RAM) 12, a hard disk drive (HDD) 13, a graphic processor 14, an input interface 15, an optical drive device 16, a device connection interface 17, and a network interface 18, for example. Those components 11-18 are configured to be communicatively connected to each other through a bus 19.

The processing unit (processor) 11 controls the entire computer 10. The processor 11 may be a multiprocessor. The processor 11 may be one of a central processing unit (CPU), a micro processing unit (MPU), a digital signal processor (DSP), an application specific integrated circuit (ASIC), a programmable logic device (PLD), and a field programmable gate array (FPGA), for example. Alternatively, the processor 11 may be a combination of two or more of CPUs, MPUs, DSPs, ASICs, PLDs, and FPGAs.

The RAM (storing unit) 12 is used as a main memory device of the computer 10. At least a part of an operating system (OS) program and application programs to be executed by the processor 11 is stored temporarily in the RAM 12. A various types of data used for processes by the processor 11 are also stored in the RAM 12. The application programs may include an EMC countermeasure verification program (design assistance program; refer to the reference symbol 32 in FIG. 1) which is executed by the processor 11 to embody the EMC countermeasure verification function (design assistance function) of the present embodiment by the computer 10.

The HDD (storing unit) 13 magnetically reads and writes data from and to disks included in the HDD 13. The HDD 13 is used as an auxiliary memory device of the computer 10. The OS program, the application programs, and a various types of data are stored in the HDD 13. As the auxiliary memory device, a storage class memory may be used, or a solid state drive (SSD), such as a flash memory, may be used.

A monitor (display unit, output unit) 14a is connected to the graphic processor 14. The graphic processor 14 causes an image to be displayed on a screen of the monitor 14a in accordance with a command from the processor 11. Examples of the monitor 14a include a display apparatus employing a cathode ray tube (CRT), a liquid crystal display apparatus, and the like.

A keyboard 15a and a mouse 15b are connected to the input interface 15. The input interface 15 transmits signals sent from the keyboard 15a or the mouse 15b to the processor 11. Note that the mouse 15b is one example of a pointing device, and other pointing devices may be used. Examples of other pointing devices include a touch panel, a tablet, a touch pad, a trackball, and the like.

The optical drive device 16 reads data recorded on an optical disk 16a using laser light or the like. The optical disk 16a is a non-transitory portable recording medium in which data is recorded so as to be readable using reflections of light. Examples of the optical disk 16a include a digital versatile disc (DVD), a DVD-RAM, a compact disc read only memory (CD-ROM), a CD-R (Recordable)/RW (Re-Writable), and the like.

The device connection interface 17 is an communication interface to connect peripheral devices to the computer 10. For example, a storage device 17a and a memory reader/writer 17b may be connected to the device connection interface 17. The storage device 17a is a non-transitory recording medium, e.g., a universal serial bus (USB) memory, for example, having a function to communicate with the device connection interface 17. The memory reader/writer 17b writes and reads data to and from a memory card 17c. The memory card 17c is a card-type non-transitory recording medium.

The network interface 18 is connected to a network 18a. The network interface 18 transmits and receives data from and to other computers or communication devices through the network 18a.

The EMC countermeasure verification function (design assistance function) of the present embodiment, which will be described later with reference to FIGS. 1 and 11-17, can be embodied by the computer 10 having the hardware configuration as described above.

Note that the computer 10 embodies the EMC countermeasure verification function (design assistance function) of the present embodiment by executing a program (the EMC countermeasure verification program 32 that will be described later, or the like) recorded on a non-transitory computer-readable recording medium, for example. The program that specifies the contents of processes to be executed by the computer 10 may be recorded on a wide variety of recording media. For example, a program to be executed by the computer 10 may be stored in the HDD 13. The processor 11 loads at least a part of the program in the HDD 13 to the RAM 12, and executes the loaded program.

Alternatively, the program to be executed by the computer 10 (the processor 11) may be recorded on a non-transitory portable recording medium, such as the optical disk 16a, the storage device 17a, the memory card 17c. The program stored in the portable recording medium becomes executable in accordance with a control from the processor 11, after being installed to the HDD 13, for example. Alternatively, the processor 11 may read the program directly from the portable recording medium and execute the program.

(3) Functional Configuration of Information Processing Apparatus of Present Embodiment Having EMC Countermeasure Verification Function Next, referring to FIG. 1, a functional configuration of the information processing apparatus (computer) 10 of the present embodiment having the EMC countermeasure verification function will be described. FIG. 1 is a block diagram illustrating one example of such a functional configuration.

In a CAD design phase, as one of design assistance functions, the computer 10 embodies a function to verify whether or not leakage of electromagnetic noises can be suppressed by an EMC countermeasure (electromagnetic noise countermeasure) provided to the casing 110 for an electronic device. Therefore, as depicted in FIG. 1, the computer 10 has functions as at least a processing unit 20, a storing unit 30, an input unit 40, and a display unit 50. Note that the target of a verification is design data (CAD data, structure/board data) 31 of the casing 110 for the electronic device, as depicted in FIGS. 3, 4, 6, 9-11, 13, and 14, for example.

The processing unit 20 is the processor 11 as depicted in FIG. 2, for example. By executing the EMC countermeasure verification program 32, the processing unit 20 functions as a control unit 21, a computation unit 22, a determination unit 23, and a display control unit 24 which will be described later.

The storing unit 30 is the RAM 12 and/or the HDD 13 as depicted in FIG. 2, for example, and stores and saves various types of information for embodying the EMC countermeasure verification function (design assistance function). Examples of the various types of information include design data (CAD data, structure/board data) 31, a securing section coupling rule 33, an overlap width recognition rule 34, and a comparison rule 35, as well as the EMC countermeasure verification program 32 described above.

The design data 31 is CAD data that is created for the casing 110 for the electronic device, which is the target of the EMC countermeasure verification. The design data 31 include information about various clock signal frequencies used in that electronic device. The design data 31 is modified by a user or the like, in accordance with a result of an EMC countermeasure verification according to the present embodiment (refer to Step S22 in FIGS. 16 and 17).

The EMC countermeasure verification program 32 causes the processing unit 20 (the processor 11) to execute functions as the control unit 21, the computation unit 22, the determination unit 23, and the display control unit 24, which will be described later.

As will be described later, the securing section coupling rule 33 is used to identify and extract securing sections including the screws 113 from the design data 31. The securing section coupling rule 33 has been created in advance in a form of table, and has been saved in the storing unit 30, as depicted in FIG. 12 or 15, for example. The securing section coupling rule 33 may include definitions of securing sections (refer to FIGS. 11 and 14) and a definition of the coupling distance y (refer to FIG. 11).

Figure 11:
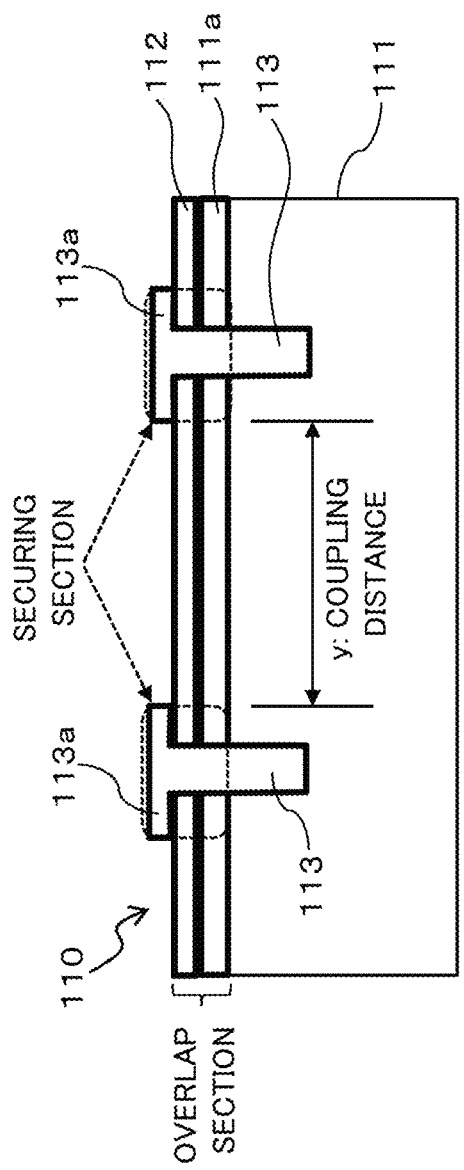
FIG. 11 is a sectional view schematically depicting the main portion of the casing for an electronic device, in order to describe the securing sections and the coupling distance y in the present embodiment in detail.

Here, in the present embodiment, referring to FIG. 11, the definitions of securing sections including the screws 113 and the definition of the securing section coupling distance y will be described. As depicted in FIG. 11, when the casing 110 is constructed by securing the lid 112 to the flange section 111a of the box-shaped body 111 with the screws 113, substantially rectangular areas surrounded by the broken lines including the flange sections 113a of the screws 113 are defined as securing sections. Then, as depicted in FIG. 11, the distance between the securing sections including the adjacent screws 113, 113 is defined as the securing section coupling distance y. Note that FIG. 11 is a sectional view schematically depicting the main portion of the casing 110 for an electronic device, in order to describe the securing sections and the coupling distance y in the present embodiment in detail.

Furthermore, a table in a matrix format depicted in FIG. 12 may be used as the securing section coupling rule 33, for example. FIG. 12 is a diagram illustrating one example of the securing section coupling rule of the present embodiment. In the table depicted in FIG. 12, securing sections that secure an upper structural member and a lower structural member with securing parts while maintaining the conductivity are indicated with "o". The "SECURING PARTS" in FIG. 12 include screws, bolts, nuts, rivets, calking, welding, nails, for example. The "EMC COUNTERMEASURES PURCHASED PARTS" in FIG. 12 include gaskets, conductive rubbers, and springs, for example.

Figure 13:
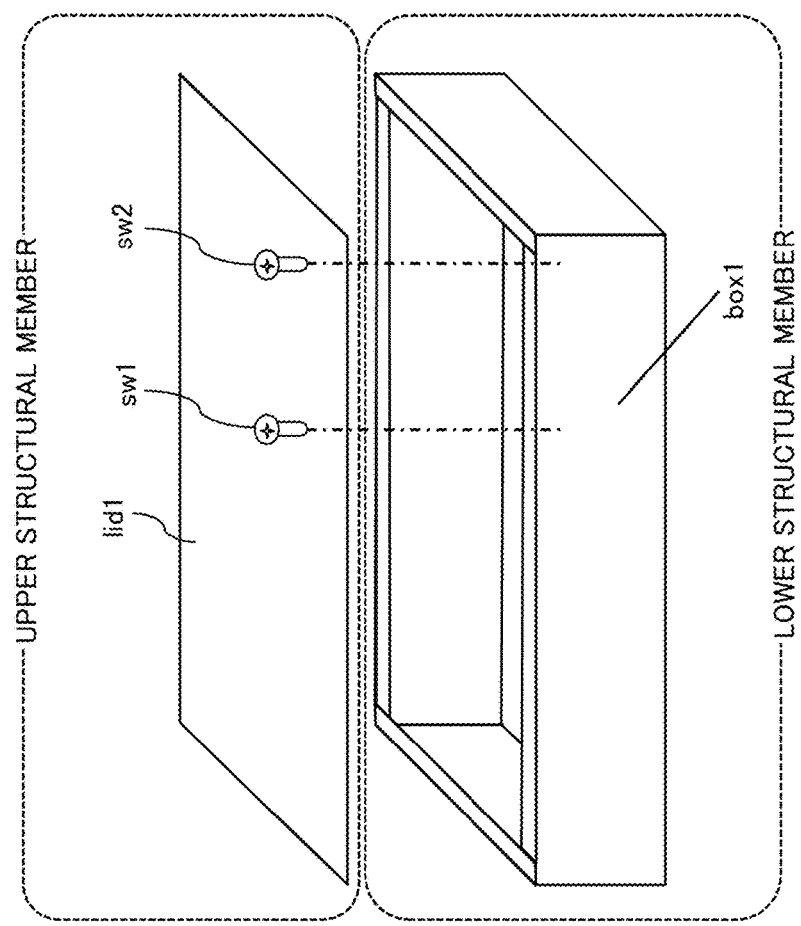
FIG. 13 is an exploded perspective view schematically depicting a specific example of a casing for an electronic device, in order to describe the securing section coupling rule of the present embodiment.
Figure 14:
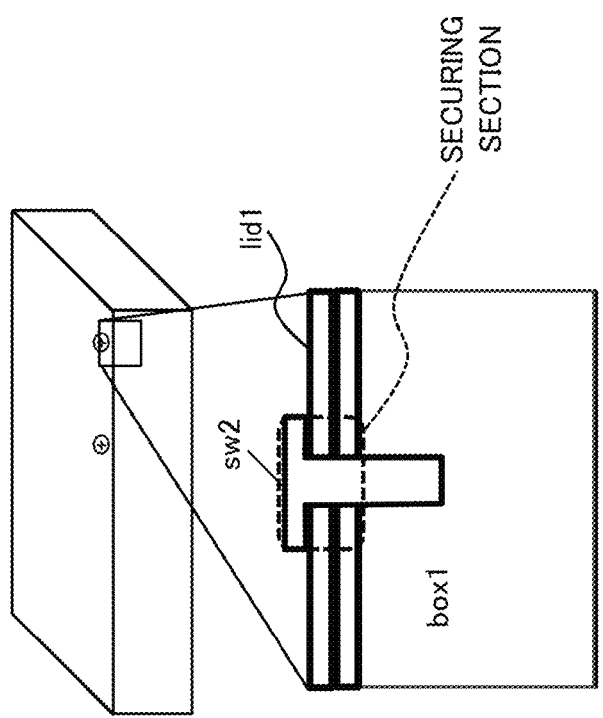
FIG. 14 is a sectional view schematically depicting the main portion of the casing for the electronic device, in order to describe a securing section in the present embodiment in detail.

Further, referring to FIGS. 13-15, a more concrete securing section coupling rule 33 will be described. FIG. 13 is an exploded perspective view schematically depicting a specific example of a casing of an electronic device, in order to describe the securing section coupling rule of the present embodiment. FIG. 14 is a sectional view schematically depicting the main portion of the casing of the electronic device, in order to describe a securing section in the present embodiment in detail. FIG. 15 is a diagram illustrating the securing section coupling rule for the casing depicted in FIGS. 13 and 14.

Similarly to the casing 110 depicted in FIG. 10, in the specific example depicted in FIG. 13, a verification-target casing is constructed from a lid "lid1" as an upper structural member, screws "sw1, sw2", and a box-shaped body "box1" as a lower structural member. The securing section that secures the lid "lid1" and the box-shaped body "box1" with the screws "sw1, sw2" while maintaining conductivity is the substantially rectangular area surrounded by the broken line including the flange sections of the screw "sw2" as depicted in FIG. 14, for example. In this case, the securing section coupling rule 33 for the casing depicted in FIG. 13 is generated in a form of table as depicted in FIG. 15, and is stored in the storing unit 30, for example.

The overlap width recognition rule 34 is to define the overlapping width (overlap width) x of the overlap sections (overlapping sections) of the box-shaped body 111 and the lid 112, and is used to recognize and calculate the overlapping width (overlap width) x from the design data 31, as will be described later. As set forth above, in the example depicted in FIGS. 6, 9, and 10, the width equivalent to the widths of the side plates of the box-shaped body 111 is defined as the overlap width x. Further, in the example depicted in FIG. 11, the length from the upper surfaces of the side plates of the box-shaped body 111, to which the lower surface of the lid 112 contacts, to the upper surface of the flange section 111a (the length in the direction of the plate thickness of the side plates) is defined as the overlap width x. Because the direction of the overlap width x (the direction of the plate thickness of the side plates) is the direction perpendicular to the sheet of FIG. 11, the overlap width x is not illustrated and the cross-section of the flange section 111a is illustrated.

The comparison rule 35 defines the above-described formulae (1) and (2) or the above-described formulae (1)' and (2)' for calculating the recommended coupling distance Y to be used as the verification standard for an EMC countermeasure based on the overlap width x and the frequency f (wavelength $\lambda$) of electromagnetic noises. Here, the formulae to calculate the recommended coupling distance Y to attenuate electromagnetic noises by a certain attenuation amount of 30 dB, are defined. The present invention is not limited to the particular formulae. Hence, for attenuating electromagnetic noises by any desired attenuation amount, formulae suitable to that desired attenuation amount are defined and the recommended coupling distance Y to attenuate electromagnetic noises by the desired attenuation amount is calculated.

The input unit 40 is the keyboard 15a and the mouse 15b as depicted in FIG. 2, for example, and is operated by a user to make various instructions for an EMC countermeasure verification (design assistance) and various instructions for modifying the design data 31. Note that a touch panel, a tablet, a touch pad, a trackball, and the like may be used in place of the mouse 15b.

The display unit 50 is the monitor 14a as depicted in FIG. 2, for example, and the display status thereof is controlled by the display control unit 24 that will be described below, through the graphic processor 14. In the present embodiment, the display unit 50 outputs, to the display, the design data 31, various types of information for modifying the design data 31, a result of an EMC countermeasure verification (pass/fail), and the like.

Next, the functions as the control unit 21, the computation unit 22, the determination unit 23, and the display control unit 24, which are embodied by the processing unit 20 (the processor 11), will be described.

The control unit 21 manages operations of the processing unit 20 in a centralized manner, and recognizes and controls various processes in the processing unit 20, e.g., processes by the computation unit 22, the determination unit 23 and the display control unit 24, for example.

Figure 16:
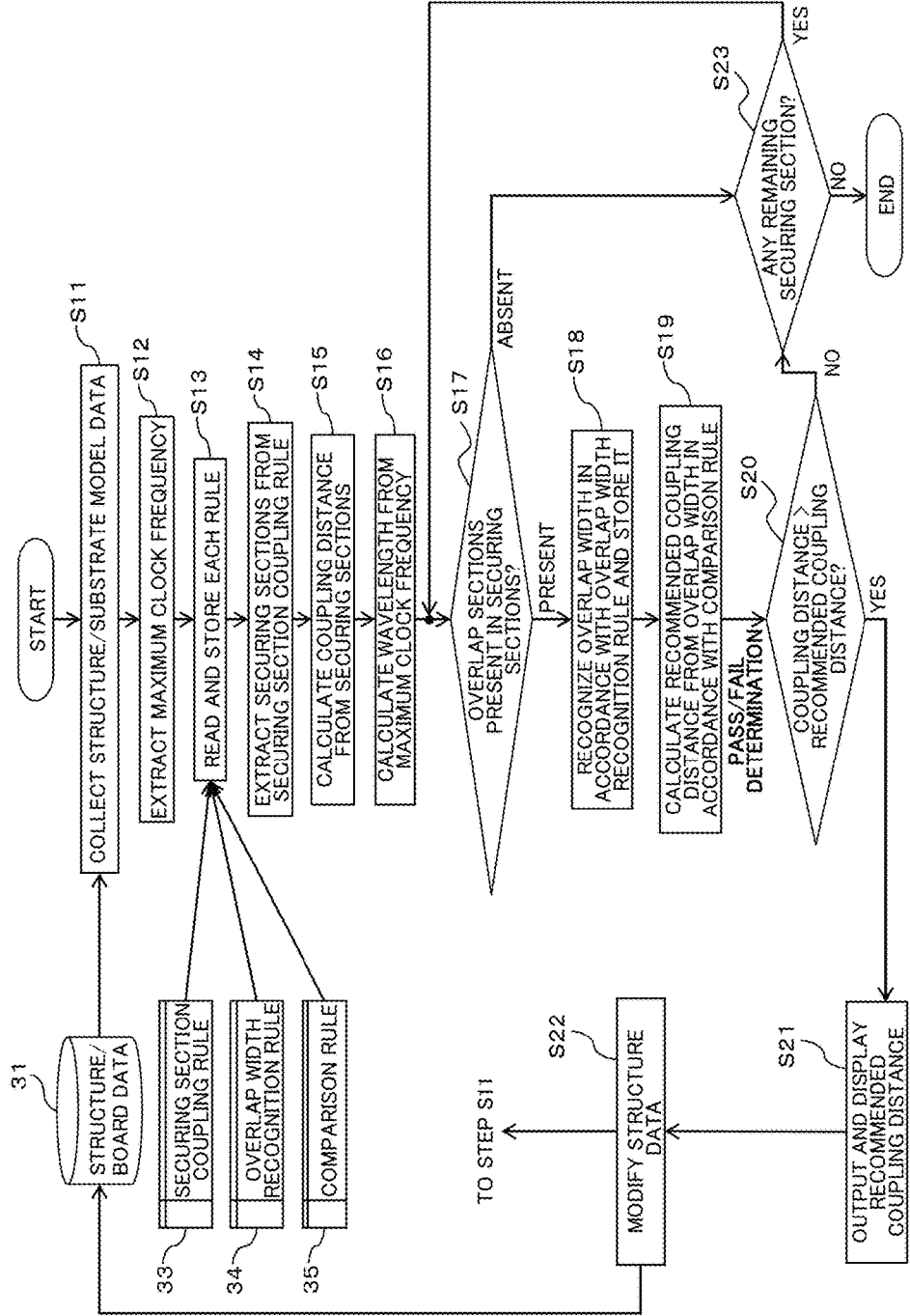
FIG. 16 is a flowchart illustrating one example of an electromagnetic noise countermeasure verification operation by the information processing apparatus of the present embodiment.
Figure 17:
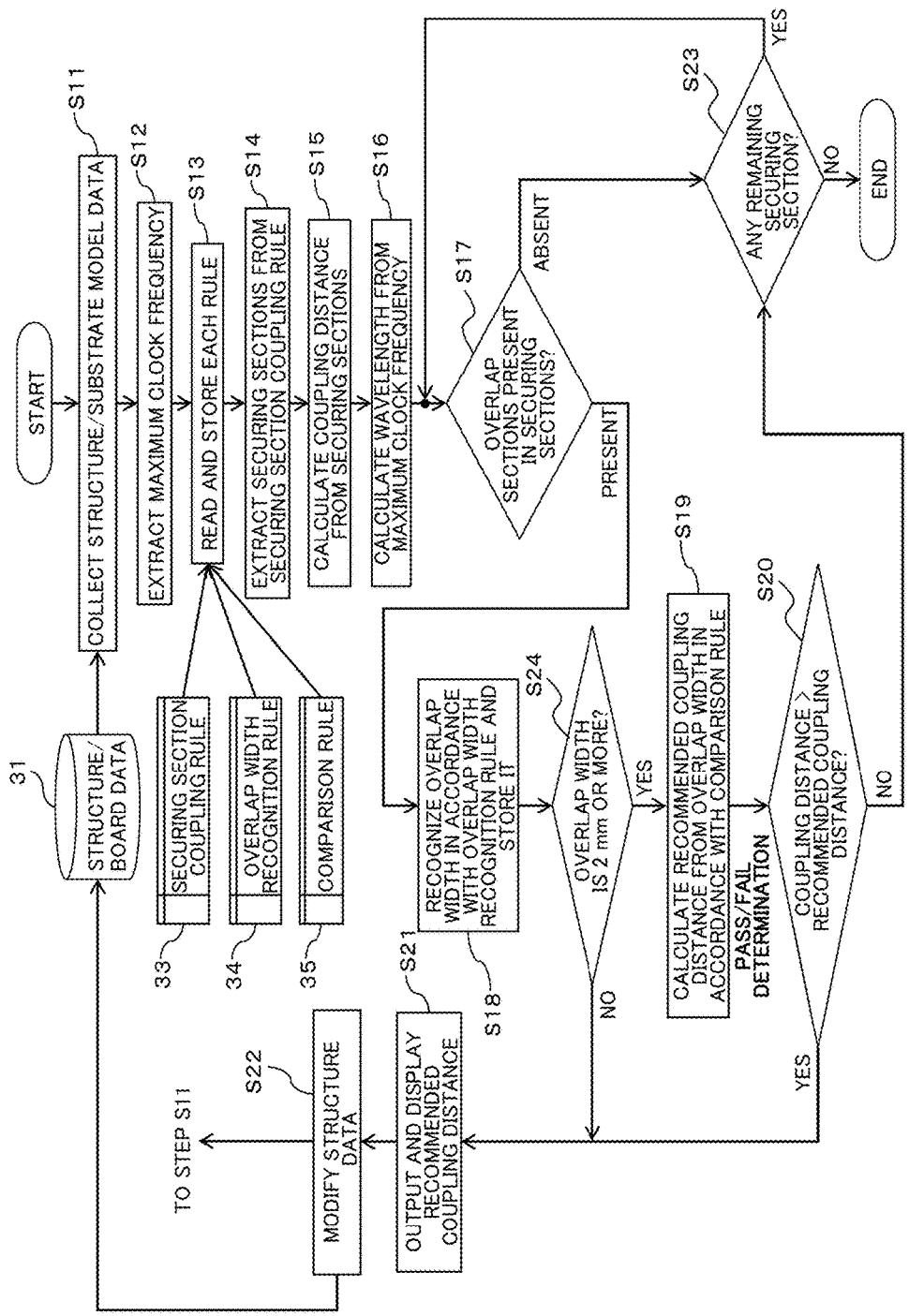
FIG. 17 is a flowchart illustrating another example of the electromagnetic noise countermeasure verification operation by the information processing apparatus of the present embodiment.

The computation unit 22 executes various computation processes to embody the EMC countermeasure verification function of the present embodiment, and carries out the functions [a1]-[a3] as follows:

[a1] A function to calculate the overlap width x based on the design data 31, in accordance with the overlap width recognition rule 34 (refer to Step S18 in FIGS. 16 and 17). The function [a1] embodies a function to extract, from the design data 31, the overlapping width x of the overlap sections provided to the two members 111 and 112 for coupling the two members 111 and 112 with a plurality of securing elements 113, and the overlap sections contact to each other. When the overlap width x is not a constant, the minimum overlap width of the overlap sections may be extracted from the design data 31 as the overlapping width x.

[a2] A function to extract the maximum clock frequency f of frequencies of clocks used in electric components 116, from the design data 31, and calculate to extract the value c/f by dividing the speed of light c by the maximum clock frequency f, as the wavelength $\lambda$ of electromagnetic noises (refer to Steps S12 and S16 in FIGS. 16 and 17). The function [a2] embodies a function to extract the wavelength $\lambda$ of electromagnetic noises generated from the electric components 116, from the design data 31.

[a3] A function to calculate to extract, for the securing sections (refer to FIG. 11) extracted from the design data 31 by a function [b1] described later, the distance between the securing sections, as the coupling distance y (refer to Step S15 in FIGS. 16 and 17). The function [a3] embodies a function to extract, from the design data 31, the coupling distance y of a plurality of securing elements 113 for coupling the two members 111 and 112 to construct the casing 110 for accommodating the circuit board 115 having the electric components 116 mounted thereon inside space surrounded by a conductor.

The determination unit 23 executes various determination processes to embody the EMC countermeasure verification function of the present embodiment, and carries out the functions [b1]-[b4] as follows:

[b1] A function to identify and extract securing sections (refer to FIG. 11) from the design data 31 in accordance with the securing section coupling rule 33 (refer to Step S14 in FIGS. 16 and 17).

[b2] A function to calculate the recommended coupling distance Y to attenuate electromagnetic noises by a certain attenuation amount (e.g., 30 dB), based on the overlap width x extracted by the function [a1] and the wavelength $\lambda$ extracted by the function [a2], in accordance with the comparison rule 35, i.e., in accordance with the above-described formulae (1) and (2) or the above-described formulae (1)' and (2)' (refer to Step S19 in FIGS. 16 and 17).

[b3] A function to compare the coupling distance y extracted by the function [a3] with the recommended coupling distance Y calculated by the function [b2] (refer to Step S20 in FIGS. 16 and 17). In other words, the function [b3] determines whether or not electromagnetic noises leak from a gap of the casing 110 (refer to FIG. 4), as an EMC countermeasure verification result (pass/fail). In this case, the function [b3] may function to output that the result of the EMC countermeasure verification for the casing 110 is a pass (there is no leakage of electromagnetic noises) when the coupling distance y is equal to or smaller than the recommended coupling distance Y (refer to FIGS. 7 and 8). In contrast, the function [b3] may function to output that the result of the EMC countermeasure verification for the casing 110 is a fail (there is leakage of electromagnetic noises) when the coupling distance y exceeds the recommended coupling distance Y.

[b4] A function to compare the overlap width x extracted by the function [a1] with a certain width (e.g., 2 mm) preset in the storing unit 30 (refer to Step S24 in FIG. 17). In this case, when the overlap width x is smaller than the certain width, the function [b4] may output that the result of the electromagnetic noise countermeasure verification for the casing 110 is a fail. The function [b4] is used in another example of an EMC countermeasure verification operation that will be described later with reference to FIG. 17.

The display control unit 24 causes various types of information to be displayed on the display unit 50 to present the information to a user by controlling the display status of the display unit 50 (refer to Step S21 in FIGS. 16 and 17). Particularly, the display control unit 24 controls the display status of the display unit 50 such that the design data 31, various types of information for modifying the design data 31, and a result of an EMC countermeasure verification (pass/fail) are displayed on the display unit 50. When a notification that the EMC countermeasure verification result is a fail is made to a user, the display control unit 24 may control the display status of the display unit 50 such that the gap between securing sections (refer to FIG. 4) of which coupling distance y has been determined as smaller than the recommended coupling distance Y, is highlighted on the screen of the display unit 50, as the gap section from which electromagnetic noises leak. In addition, the display control unit 24 may control the display status of the display unit 50 such that the recommended coupling distance Y is displayed on the display unit 50.

(4) Operations of Information Processing Apparatus of Present Embodiment Having EMC Countermeasure Verification Function Next, referring to FIGS. 16 and 17, specific EMC countermeasure verification operations by the information processing apparatus 10 of the present embodiment will be described.

First, referring to the flowchart depicted in FIG. 16 (Steps S11 to S23), one example of an EMC countermeasure verification operation by the information processing apparatus 10 of the present embodiment will be described.

After initiating an EMC countermeasure verification operation, in Step S11, the processing unit 20 collects structure/substrate model data of a casing 110 or the like, which is the target of the EMC countermeasure, from the design data 31 in the storing unit 30. Then in Step S12, using the above-described function [a2], the processing unit 20 extracts, from the structure/substrate model data collected in Step S11, the maximum clock frequency f of clock frequencies used in the electric components 116. Further, in Step S13, the processing unit 20 reads the securing section coupling rule 33, the overlap width recognition rule 34, and the comparison rule 35 in the storing unit 30, and stores them.

Thereafter, in Step S14, using the above-described function [b1], the processing unit 20 identifies to extract securing sections (refer to FIGS. 11 and 14) from the structure/substrate model data, in accordance with the securing section coupling rule 33 read in Step S13.

In Step S15, using the above-described function [a3], the processing unit 20 calculates to extract, for the securing sections extracted in Step S14 (refer to FIGS. 11 and 14), the distance between the securing sections as the coupling distance y.

Further, in Step S16, using the above-described function [a2], the processing unit 20 calculates to extract the value c/f by dividing the speed of light c by the maximum clock frequency f extracted in Step S12 as the wavelength λ of electromagnetic noises.

Subsequently, in Step S17, the processing unit 20 determines whether or not sections of the members of the securing sections extracted in Step S14 overlap (for example, whether or not there are overlap sections of the box-shaped body 111 and the lid 112 constructing the casing 110).

When it is determined that there are overlap sections (the PRESENT route from Step S17), in Step S18, the processing unit 20 recognizes, calculates, and stores the overlap width x based on the structure/substrate model data in accordance with the overlap width recognition rule 34, using the above-described function [a1]. As described above, when the overlap width x is not a constant, the minimum overlap width of the overlap sections is extracted as the overlapping width x.

Further, in Step S19, using the above-described function [b2], the processing unit 20 calculates the recommended coupling distance Y to attenuate electromagnetic noises by a certain attenuation amount (e.g., 30 dB) based on the overlap width x extracted in Step S18 and the wavelength λ extracted in Step S16 in accordance with the comparison rule 35. In other words, the recommended coupling distance Y is calculated in accordance with the above-described formulae (1) and (2) or the above-described formulae (1)' and (2)'.

Then, in Step S20, using the above-described function [b3], the processing unit 20 compares the coupling distance y extracted in Step S15 with the recommended coupling distance Y calculated in Step S19. In other words, as described above, it is determined whether or not electromagnetic noises leak from the gap of the casing 110 (refer to FIG. 4) as an EMC countermeasure verification result (pass/fail) by the function [b3].

When the coupling distance y exceeds the recommended coupling distance Y (the YES route from Step S20), a notification is output indicating that the result of the EMC countermeasure verification for the casing 110 is a fail (there is leakage of electromagnetic noises), and is notified to the display control unit 24, by the above-described function [b3]. When receiving the notification of the fail, in Step S21, the display control unit 24 notifies the user that the EMC countermeasure verification result is a fail. In this case, the gap between securing sections (refer to FIG. 4) of which coupling distance y has been determined as smaller than the recommended coupling distance Y, is highlighted on the screen of the display unit 50 as a leak gap section of electromagnetic noises, and the recommended coupling distance Y is displayed on the display unit 50.

In Step S22, the user or the like who sees the display as described above on the display unit 50 modifies the design data 31 such that the leakage of electromagnetic noises from the gap section highlighted is eliminated by operating the input unit 40. The modification of the design data 31 may be made automatically by the processing unit 20. Thereafter, the processing unit 20 returns to the process in Step S11.

In contrast, when it is determined that there is no overlap section (the ABSENT route from Step S17) or when the coupling distance y is equal to or smaller than the recommended coupling distance Y (the NO route from Step S20), in Step S23, the processing unit 20 determines whether or not there is any remaining securing section. When there is any remaining securing section (the YES route from Step S23), the processing unit 20 returns to Step S17 and executes the processes in Steps S17 to S23 for the remaining securing section. In contrast, when there is no remaining securing section (the NO route from Step S23), the processing unit 20 terminates the EMC countermeasure verification process.

When the coupling distance y is equal to or smaller than the recommended coupling distance Y, i.e., when the result of the EMC countermeasure verification for the casing 110 is a pass (there is no leakage of electromagnetic noises), the display control unit 24 may control the display status of the display unit 50 such that a notification to the user is made that the EMC countermeasure verification result is a pass. In this case, the display control unit 24 may cause the distance between the securing sections of which coupling distance y is determined as equal to or smaller than the recommended coupling distance Y, to be displayed on the screen of the display unit 50, and may also cause the recommended coupling distance Y to be displayed on the screen of the display unit 50.

Subsequently, referring to the flowchart depicted in FIG. 17 (Steps S11 to S24), another example of an EMC countermeasure verification operation by the information processing apparatus 10 of the present embodiment will be described.

In the another example of the EMC countermeasure verification operation depicted in FIG. 17, the process in Step S24 is added between Step S18 and Step S19, as well as having the Steps S11 to S23 that are the same as those in the one example of EMC countermeasure verification operation depicted in FIG. 16.

In Step S24, using the above-described function [b4], the processing unit 20 compares the overlap width x extracted in Step S18 with a certain width of 2 mm that has been preset in the storing unit 30. In this step, when the overlap width x is equal to or greater than the certain width (the YES route from Step S24), the processing unit 20 transitions to the process in Step S19. In contrast, when the overlap width x is smaller than the certain width (the NO route from Step S24), a notification is output indicating that the result of the electromagnetic noise countermeasure verification for the casing 110 is a fail, and is notified to the display control unit 24.

When receiving the notification of the fail, in Step S21, the display control unit 24 notifies the user that the EMC countermeasure verification result is a fail because the overlap width x is smaller than the certain width. In this case, the overlap sections of which overlap width x is determined as smaller than the certain width, are highlighted on the screen of the display unit 50, and the overlap width x is displayed on the display unit 50.

In the present embodiment, when the overlap width x is smaller than the certain width of 2 mm, it is determined that a result of the EMC countermeasure verification is a fail because the overlap sections of the box-shaped body 111 and the lid 112 are too narrow and sufficient securing cannot be ensured.

(5) Advantageous Effects of the Present Embodiment

As described above, according to the present embodiment, by storing the securing section coupling rule 33, the overlap width recognition rule 34, and the comparison rule 35 in advance, the recommended coupling distance (threshold) Y for verifying the coupling distance y of securing sections can be automatically recognized based on the CAD data 31 without requiring human interventions.

Therefore, a verifications of an EMC countermeasure can be made reliably, without relying on settings by a user, as well as by taking the overlap width x of overlap sections into considerations. As a result, determinations on thresholds by humans can be eliminated and the overlap width x of overlap sections can be reflected to verifications. In addition, occurrence of deviations of leakage of electromagnetic noises can be suppressed in a reliable manner, and an occurrence of a human task error can also be suppressed.

Furthermore, according to the present embodiment, it is possible to maximize the coupling distance y of securing sections (e.g., the screws 113), while ensuring the effect of an EMC countermeasure (the effect to attenuate the leakage amount of electromagnetic noises). As a result, the workability of securing tasks of casings 110 is improved, and reductions in the number of securing parts (e.g., a reduction in 25%) and the work man-hour can also be achieved.

Furthermore, according to the present embodiment, because the circuit board 115 that is the source of electromagnetic noises is placed inside a casing 110 that has passed an EMC countermeasure verification, electromagnetic noises can be attenuated by a certain attenuation amount (e.g., 30 dB), and it is ensured that the amount of electromagnetic noises leaking outside of the casing 110 is suppressed to a certain value (e.g., 50 dBpV) or less. In addition, because the electronic device according to the present embodiment does not require flange sections that protrude outwardly, the size of the electronic device can be reduced and the designability thereof can be improved.

(6) Miscellaneous

While a preferred embodiment of the present invention has been described in detail, the present invention is not limited to the particular embodiment and a wide variety of modifications and variations can be made without departing from the spirit of the present invention.

In accordance with the present embodiment, verifications of an electromagnetic noise countermeasure can be made reliably without relying on settings by a user.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having an electromagnetic noise countermeasure verification program recorded thereon, the program causing a computer to execute processes to:
    extract, from design data, a coupling distance y of a plurality of securing elements for coupling two members to construct a casing for accommodating a circuit board having one or more electric components mounted thereon inside space surrounded by a conductor, an overlapping width x of overlap sections provided to the two members for coupling the two members with the plurality of securing elements, the overlap sections contacting to each other, and a wavelength λ of electromagnetic noises generated from the one or more electric components;
    calculate a recommended coupling distance Y for the plurality of securing elements to attenuate the electromagnetic noises by a certain attenuation amount, based on the overlapping width x and the wavelength λ that are extracted;
    compare the extracted coupling distance y with the calculated recommended coupling distance Y;
    output that a result of the electromagnetic noise countermeasure verification result for the casing is a pass when the coupling distance y is equal to or smaller than the recommended coupling distance Y; and
    output that the result of the electromagnetic noise countermeasure verification result for the casing is a fail when the coupling distance y exceeds the recommended coupling distance Y.

2. The non-transitory computer-readable recording medium according to claim 1 having the electromagnetic noise countermeasure verification program recorded thereon, wherein the program causes the computer to execute processes to:
    compare the overlapping width x with a preset certain width; and
    output that the result of the electromagnetic noise countermeasure verification result for the casing is a fail when the overlapping width x is smaller than the certain width.

3. The non-transitory computer-readable recording medium according to claim 1 having the electromagnetic noise countermeasure verification program recorded thereon, wherein the program causes the computer to execute a process to extract the coupling distance y from the design data, based on a preset coupling rule for the plurality of securing elements.

4. The non-transitory computer-readable recording medium according to claim 1 having the electromagnetic noise countermeasure verification program recorded thereon, wherein the program causes the computer to execute a process to extract, from the design data, a minimum overlap width of the overlap sections as the overlapping width x, based on a preset overlap width recognition rule.

5. The non-transitory computer-readable recording medium according to claim 1 having the electromagnetic noise countermeasure verification program recorded thereon, wherein the program causes the computer to execute processes to:
    extract a maximum clock frequency f of frequencies of clocks used in the one or more electric components, from the design data; and
    extract a value c/f by dividing a speed of light c by the maximum clock frequency f, as the wavelength λ of the electromagnetic noises.

6. The non-transitory computer-readable recording medium according to claim 1 having the electromagnetic noise countermeasure verification program recorded thereon, wherein the program causes the computer to execute a process to calculate a value of the recommended coupling distance Y of the plurality of securing elements to attenuate the electromagnetic noise by the certain attenuation amount of 30 dB, using the following formula (1) or (2):
    when x≤2.2 mm,
    $$Y=(0.13x+0.0015)\lambda \quad (1)$$
    when x>2.2 mm,
    $$Y=(10^{-5}x^2-0.0006x^2+0.012x+0.25)\lambda \quad (2).$$

7. The non-transitory computer-readable recording medium according to claim 6 having the electromagnetic noise countermeasure verification program recorded thereon, wherein the formulae (1) and (2) are expressed as the following formulae (1)' and (2)' when significant digits are increased:
    when x≤2.2 mm,
    $$Y=(0.1285x+0.0015)\lambda \quad (1)'$$
    when x>2.2 mm,
    $$Y=(10^{-5}x^3-0.0006x^2+0.0123x+0.2498)\lambda \quad (2)'.$$

8. An information processing apparatus comprising:
    a processing unit configured to verify an electromagnetic noise countermeasure for a casing for accommodating a circuit board having one or more electric components mounted thereon inside space surrounded by a conductor; and
    a storing unit configured to store design data, the processing unit being configured to:
    extract, from the design data, a coupling distance y of a plurality of securing elements for coupling two members to construct the casing, an overlapping width x of overlap sections provided to the two members for coupling the two members with the plurality of securing elements, the overlap sections contacting to each other, and a wavelength λ of electromagnetic noises generated from the one or more electric components;
    calculate a recommended coupling distance Y for the plurality of securing elements to attenuate the electromagnetic noises by a certain attenuation amount, based on the overlapping width x and the wavelength λ that are extracted;
    compare the extracted coupling distance y with the calculated recommended coupling distance Y;
    output that a result of the electromagnetic noise countermeasure verification result for the casing is a pass when the coupling distance y is equal to or smaller than the recommended coupling distance Y; and
    output that the result of the electromagnetic noise countermeasure verification result for the casing is a fail when the coupling distance y exceeds the recommended coupling distance Y.

9. The information processing apparatus according to claim 8, wherein the processing unit is configured to:
    compare the overlapping width x with a preset certain width; and
    output that the result of the electromagnetic noise countermeasure verification result for the casing is a fail when the overlapping width x is smaller than the certain width.

10. The information processing apparatus according to claim 8, wherein the processing unit is configured to extract the coupling distance y from the design data, based on a preset coupling rule for the plurality of securing elements.

11. The information processing apparatus according to claim 8, wherein the processing unit is configured to extract, from the design data, a minimum overlap width of the overlap sections as the overlapping width x, based on a preset overlap width recognition rule.

12. The information processing apparatus according to claim 8, wherein the processing unit is configured to:
   extract a maximum clock frequency f of frequencies of clocks used in the one or more electric components, from the design data; and
   extract a value c/f by dividing a speed of light c by the maximum clock frequency f, as the wavelength $\lambda$ of the electromagnetic noises.

13. The information processing apparatus according to claim 8, wherein the processing unit is configured to calculate a value of the recommended coupling distance Y of the plurality of securing elements to attenuate the electromagnetic noise by the certain attenuation amount of 30 dB, using the following formula (1) or (2):
   when $x \leq 2.2$ mm,
   $$Y = (0.13x + 0.0015)\lambda \quad (1)$$
   when $x > 2.2$ mm,
   $$Y = (10^{-5}x^3 - 0.0006x^2 + 0.012x + 0.25)\lambda \quad (2).$$

14. The information processing apparatus according to claim 13, wherein the formulae (1) and (2) are expressed as the following formulae (1)' and (2)' when significant digits are increased:
   when $x \leq 2.2$ mm,
   $$Y = (0.1285x + 0.0015)\lambda \quad (1)'$$
   when $x > 2.2$ mm,
   $$Y = (10^{-5}x^3 - 0.0006x^2 + 0.0123x + 0.2498)\lambda \quad (2)'.$$

15. A method of verifying an electromagnetic noise countermeasure by a computer, the method comprising:
   extracting, from design data, a coupling distance y of a plurality of securing elements for coupling two members to construct a casing for accommodating a circuit board having one or more electric components mounted thereon inside space surrounded by a conductor, an overlapping width x of overlap sections provided to the two members for coupling the two members with the plurality of securing elements, the overlap sections contacting to each other, and a wavelength $\lambda$ of electromagnetic noises generated from the one or more electric components;
   calculating a recommended coupling distance Y for the plurality of securing elements to attenuate the electromagnetic noises by a certain attenuation amount, based on the overlapping width x and the wavelength $\lambda$ that are extracted;
   comparing the extracted coupling distance y with the calculated recommended coupling distance Y;
   outputting that a result of the electromagnetic noise countermeasure verification result for the casing is a pass when the coupling distance y is equal to or smaller than the recommended coupling distance Y; and
   outputting that the result of the electromagnetic noise countermeasure verification result for the casing is a fail when the coupling distance y exceeds the recommended coupling distance Y.

16. The method of verifying the electromagnetic noise countermeasure according to claim 15, further comprising:
   comparing the overlapping width x with a preset certain width; and
   outputting that the result of the electromagnetic noise countermeasure verification result for the casing is a fail when the overlapping width x is smaller than the certain width.

17. The method of verifying the electromagnetic noise countermeasure according to claim 15, further comprising calculating a value of the recommended coupling distance Y of the plurality of securing elements to attenuate the electromagnetic noise by the certain attenuation amount of 30 dB, using the following formula (1) or (2):
   when $x \leq 2.2$ mm,
   $$Y = (0.13x + 0.0015)\lambda \quad (1)$$
   when $x > 2.2$ mm,
   $$Y = (10^{-5}x^3 - 0.0006x^2 + 0.012x + 0.25)\lambda \quad (2).$$

* * * * *